US008614880B2

(12) United States Patent
Naito et al.

(10) Patent No.: US 8,614,880 B2
(45) Date of Patent: Dec. 24, 2013

(54) SOLID ELECTROLYTIC CAPACITOR INCLUDING POSITIVE AND NEGATIVE ELECTRODE LEAD TERMINALS

(75) Inventors: Kazumi Naito, Tokyo (JP); Katutoshi Tamura, Tokyo (JP)

(73) Assignee: Showa Denko K.K., Tokyo (JP)

( * ) Notice: Subject to any disclaimer, the term of this patent is extended or adjusted under 35 U.S.C. 154(b) by 45 days.

(21) Appl. No.: 13/142,474

(22) PCT Filed: Dec. 28, 2009

(86) PCT No.: PCT/JP2009/071789
§ 371 (c)(1),
(2), (4) Date: Aug. 11, 2011

(87) PCT Pub. No.: WO2010/076883
PCT Pub. Date: Jul. 8, 2010

(65) Prior Publication Data
US 2011/0292573 A1    Dec. 1, 2011

(30) Foreign Application Priority Data

Dec. 29, 2008    (JP) .................................. 2008-335740

(51) Int. Cl.
*H01G 4/228*    (2006.01)
*H01G 9/00*    (2006.01)
*H01G 9/04*    (2006.01)
*H01G 9/145*    (2006.01)

(52) U.S. Cl.
USPC .......................................... 361/540; 361/528

(58) Field of Classification Search
USPC .......................................... 361/540, 528, 523
See application file for complete search history.

(56) References Cited

U.S. PATENT DOCUMENTS

| 3,550,228 | A | * | 12/1970 | Asscher .................... 29/25.42 |
| 4,247,883 | A | * | 1/1981 | Thompson et al. .......... 361/540 |
| 4,497,105 | A | * | 2/1985 | Uemura ..................... 29/25.03 |
| 4,571,662 | A | * | 2/1986 | Conquest et al. .......... 361/306.1 |
| 6,519,135 | B2 | * | 2/2003 | Sano et al. ................. 361/510 |
| 7,447,000 | B2 | * | 11/2008 | Cheng et al. ............... 361/540 |

(Continued)

FOREIGN PATENT DOCUMENTS

| DE | 3931244 A1 | * | 3/1991 |
| JP | 2003-068576 A | | 3/2003 |
| JP | 2004-055889 A | | 2/2004 |
| JP | 2004-304071 A | | 10/2004 |
| JP | 2005079357 A | * | 3/2005 |
| JP | 2005093820 A | * | 4/2005 |
| JP | 2008-091391 A | | 4/2008 |
| JP | 2009-141209 A | | 6/2009 |
| WO | 2006/120779 A1 | | 11/2006 |

OTHER PUBLICATIONS

Official Communication issued in International Patent Application No. PCT/JP2009/071789, mailed on Mar. 16, 2010.

*Primary Examiner* — David M Sinclair
(74) *Attorney, Agent, or Firm* — Keating & Bennett, LLP

(57) ABSTRACT

A solid electrolytic capacitor in which a capacitor element having a positive electrode lead wire protruded from a front face of the capacitor element and a positive electrode lead terminal connected to the positive electrode lead wire is sealed with an exterior sealing element of synthetic resin except for a part of the positive electrode lead terminal. The positive electrode lead terminal is provided with a positive electrode base frame arranged along a lower surface of the exterior sealing element so as to correspond to the positive electrode lead wire, a raised connecting piece arranged to extend upward from an edge of the positive electrode base frame along a front end face and having an upper edge to which the positive electrode lead wire is connected, and reinforcing pieces provided at both side edges of the raised connecting piece.

9 Claims, 9 Drawing Sheets

(56) References Cited

U.S. PATENT DOCUMENTS

| | | | |
|---|---|---|---|
| 2002/0163775 A1* | 11/2002 | Maeda | 361/528 |
| 2003/0151884 A1 | 8/2003 | Matsumoto | |
| 2004/0052033 A1 | 3/2004 | Sano et al. | |
| 2004/0190227 A1 | 9/2004 | Takatani et al. | |
| 2005/0117280 A1* | 6/2005 | Audo | 361/523 |
| 2005/0168921 A1* | 8/2005 | Sano et al. | 361/534 |
| 2009/0080146 A1 | 3/2009 | Horio et al. | |
| 2009/0147447 A1 | 6/2009 | Matsuoka et al. | |
| 2009/0147449 A1* | 6/2009 | Matsuoka et al. | 361/540 |
| 2010/0103591 A1* | 4/2010 | Fujii et al. | 361/540 |

\* cited by examiner

SOLID ELECTROLYTIC CAPACITOR INCLUDING POSITIVE AND NEGATIVE ELECTRODE LEAD TERMINALS

TECHNICAL FIELD

The present invention relates to a solid electrolytic capacitor in which a capacitor element is sealed with an exterior sealing element of synthetic resin, and also relates to the related art.

BACKGROUND ART

A solid electrolytic capacitor of a face mount type in which a capacitor element is sealed with synthetic resin has a structure that a positive electrode lead terminal is connected to a positive electrode lead wire protruded form a front end face of the capacitor element, a negative electrode lead terminal is connected to a negative electrode layer provided around an external periphery of the capacitor element, and the capacitor element with these terminals is sealed with resin except for a part of the lead terminals.

A solid electrolytic capacitor of this type is typically used by being mounted on an electronic substrate or the like of an electronic device, such as, e.g., a personal computer, and is required to be as small in size but large in capacitance as possible as electronic devices are reduced in size and improved in performance. To meet the requirement, conventionally, a solid electrolytic capacitor has been effectively simplified in inner structure to increase the volume of the capacitor element to thereby increase the capacitance.

Under the technical background, in the solid electrolytic capacitor shown in the below-listed Patent Document 1, it is configured such that the flat face (plate face) of the positive electrode lead terminal is in contact with the positive electrode lead wire. However, such a line contact of the lead terminal and the lead wire increases the contact area, resulting in a reduced mounting space of the capacitor element, which in turn prevents increasing of the capacitance.

In the solid electrolytic capacitors shown in the below-listed Patent Documents 2 and 3, it is configured such that a raised connecting piece is formed at the positive electrode lead terminal in an upwardly raised manner and the positive electrode lead wire is in contact with the upper edge of the raised connecting piece. In this structure, since the lead terminal and the lead wire are connected in a point-contact manner, the contact area thereof can be reduced, which in turn can increase the capacity of the capacitor element.

PRIOR ART DOCUMENTS

Patent Documents

[Patent Document 1] Japanese Unexamined Laid-open Patent Publication No. 2004-304071 (JP-2004-304071-A)
[Patent Document 2] Japanese Unexamined Laid-open Patent Publication No. 2003-68576 (JP-2003-68576-A)
[Patent Document 3] Japanese Unexamined Laid-open Patent Publication No. 2004-55889 (JP-2004-55889-A)

SUMMARY OF THE INVENTION

Problems to be Solved by the Invention

The positive electrode lead terminal of the solid electrolytic capacitor as described above had a thickness of about 100 μm. Therefore, in cases where a lead wire is connected to the upper edge of the raised connecting piece as shown in the aforementioned Patent Documents 2 and 3, there is a risk that the raised connecting piece may be deformed due to the stress applied at the time of the connection, resulting in a poor connection.

Preferred embodiments of the present invention were made in view of the abovementioned and/or other problems in the related arts. The preferred embodiments of the present invention significantly improve the existing methods and/or devices.

The present invention was made in view of the aforementioned problems, and aims to provide a solid electrolytic capacitor and its related technologies capable of assuredly connecting a lead terminal and a lead line while increasing the capacity of a capacitor element.

The other purposes and advantages of the present invention will be apparent from the preferred embodiments described below.

Means to Solve the Problems

To achieve the aforementioned purpose, the present invention has the following structure.

[1] A solid electrolytic capacitor comprising:
a capacitor element having a positive electrode lead wire protruding from a front end face of the capacitor element and a negative electrode layer provided at an outer periphery of the capacitor element;
a positive electrode lead terminal electrically connected to the positive electrode lead wire; and
a negative electrode lead terminal electrically connected to the negative electrode layer,
wherein the capacitor element, the positive electrode lead terminal, and the negative electrode lead terminal are sealed with an exterior sealing element made of synthetic resin except for a part of the positive electrode lead terminal and the negative electrode lead terminal, and
wherein the positive electrode lead terminal includes:
a positive electrode base frame arranged along a lower surface of the exterior sealing element so as to correspond to the positive electrode lead wire;
a raised connecting piece arranged to extend upward from an edge of the positive electrode base frame along a front end face of the capacitor element and having an upper edge to which the positive electrode lead wire is connected; and
reinforcing pieces arranged at both side edges of the raised connecting piece and between both side edges of the positive electrode base frame.

[2] The solid electrolytic capacitor as recited in the aforementioned Item 1, wherein the raised connecting piece is formed by upwardly bending a piece connected to an edge of the positive electrode base frame.

[3] The solid electrolytic capacitor as recited in the aforementioned Item 2, wherein cutout concave portions are formed on both sides of a bending portion of the raised connecting piece positioned between the positive electrode base frame and the raised connecting piece.

[4] The solid electrolytic capacitor as recited in any one of the aforementioned Items 1 to 3, wherein the reinforcing pieces are formed by bending portions connected to side edges of the raised connecting piece.

[5] The solid electrolytic capacitor as recited in any one of the aforementioned Items 1 to 4, wherein the raised connecting piece and the positive electrode lead wire are joined by welding.

[6] The solid electrolytic capacitor as recited in any one of the aforementioned Items 1 to 5, wherein the positive electrode lead wire is secured to the raised connecting piece in such a manner that the positive electrode lead wire is fitted in a dent of the raised connecting piece.

[7] The solid electrolytic capacitor as recited in the aforementioned Item 6, where a fit-in amount of the positive electrode lead wire with respect to the raised connecting piece is ⅖ to ¾ of an outer diameter of the positive electrode lead wire.

[8] The solid electrolytic capacitor as recited in any one of the aforementioned Items 1 to 7, wherein the negative electrode lead terminal includes a negative electrode base frame arranged along a lower surface of a rear portion of the exterior sealing element, and a flat connecting piece connected to a lower surface of the capacitor element.

[9] The solid electrolytic capacitor as recited in any one of the aforementioned Items 1 to 8, wherein the negative electrode lead terminal is provided with guide pieces arranged to extend upward along a rear end face of the capacitor element.

[10] The solid electrolytic capacitor as recited in the aforementioned Item 9, wherein the guide pieces are formed by upwardly bending pieces connected to both side edges of the negative electrode base frame.

[11] A manufacturing method of a solid electrolytic capacitor, the method comprising:

a step of preparing a capacitor element provided with a positive electrode lead wire protruding from a front end face of the capacitor element and a negative electrode layer formed at an outer periphery of the capacitor element;

a step of preparing a positive electrode lead terminal including a positive electrode base frame, a raised connecting piece arranged to extend upward from an edge of the positive electrode base frame, and reinforcing pieces arranged at both side edges of the raised connecting piece and between both side edges of the positive electrode base frame;

a step of preparing a negative electrode lead terminal;

a step of connecting the positive electrode lead wire to an upper end edge of the raised connecting piece in a state in which the positive electrode base terminal is arranged such that the positive electrode base frame is arranged at a lower portion in front of the capacitor element;

a step of connecting the negative electrode lead terminal to the negative electrode layer of the capacitor element; and a step of forming an exterior sealing element by molding the capacitor element having both the lead terminals with synthetic resin except for a portion of both the lead terminals.

[12] The manufacturing method of a solid electrolytic capacitor as recited in the aforementioned Item 11, wherein a tabular positive electrode lead terminal forming developed product having a positive electrode base frame forming region corresponding to the positive electrode base frame, a raised connecting piece forming region connected to an edge of the positive electrode base frame forming region, and reinforcing piece forming regions connected to both side edges of the raised connecting piece forming region is preliminarily prepared, and wherein the step of preparing the positive electrode lead terminal includes:

a step of forming the raised connecting piece by bending the raised connecting piece forming region of the tabular positive electrode lead terminal forming developed product with respect to the positive electrode base frame forming region; and a step of forming the reinforcing pieces by bending the reinforcing piece forming regions of the positive electrode lead terminal forming developed product with respect to the raised connecting piece forming region.

[13] The manufacturing method of a solid electrolytic capacitor as recited in the aforementioned Item 12, wherein at the step of preparing the positive electrode lead terminal, the step of forming the raised connecting piece is performed after performing the step of forming the reinforcing piece.

[14] The manufacturing method of a solid electrolytic capacitor as recited in any one of the aforementioned Items 11 to 13, further comprising a step of connecting the positive electrode lead wire to the raised connecting piece by spot welding.

[15] A positive electrode lead terminal of a solid electrolytic capacitor electrically connected to a positive electrode lead wire protruding from a front end face of a capacitor element and sealed with an exterior sealing element made of synthetic resin together with the capacitor element except for a part of the positive electrode lead terminal, the positive electrode lead terminal comprising:

a tabular positive electrode base frame;

a raised connecting piece arranged to extend upward from an edge of the positive electrode base frame and connected to the positive electrode lead wire; and reinforcing pieces arranged at both side edges of the raised connecting piece and between both side edges of the positive electrode base frame.

Effects of the Invention

According to the solid electrolytic capacitor of the invention [1], the lead terminal and the lead wire can be assuredly connected while increasing the capacitance of the capacitor element.

According to the solid electrolytic capacitor of the inventions [2] and [3], the raised connecting piece of the positive lead terminal can be easily formed.

According to the solid electrolytic capacitor of inventions [4] and [5], the reinforcing pieces of the positive lead terminal can be easily formed.

According to the solid electrolytic capacitor of the inventions [6] and [7], the lead wire can be strongly secured to the raised connecting piece.

According to the solid electrolytic capacitor of the invention [8], the negative lead wire can be effectively mounted.

According to the solid electrolytic capacitor of the invention [9], displacement of the capacitor element can be prevented.

According to the solid electrolytic capacitor of the invention [10], the guide piece of the negative lead wire can be easily formed.

According to the invention [11], the solid electrolytic capacitor of the present invention can be manufactured.

According to the invention [12], the solid electrolytic capacitor of the present invention can be easily manufactured.

According to the invention [13], the solid electrolytic capacitor of the present invention can be effectively manufactured.

According to the invention [14], the solid electrolytic capacitor of the present invention can be assuredly manufactured.

The solid electrolytic capacitor of the present invention can be assuredly manufactured by using the positive lead terminal of the solid electrolytic capacitor of the invention [15].

According to the invention [16], the positive lead terminal of the solid electrolytic capacitor of the present invention can be manufactured.

DETAILED DESCRIPTION OF THE PREFERRED EMBODIMENTS

Figure 1A:
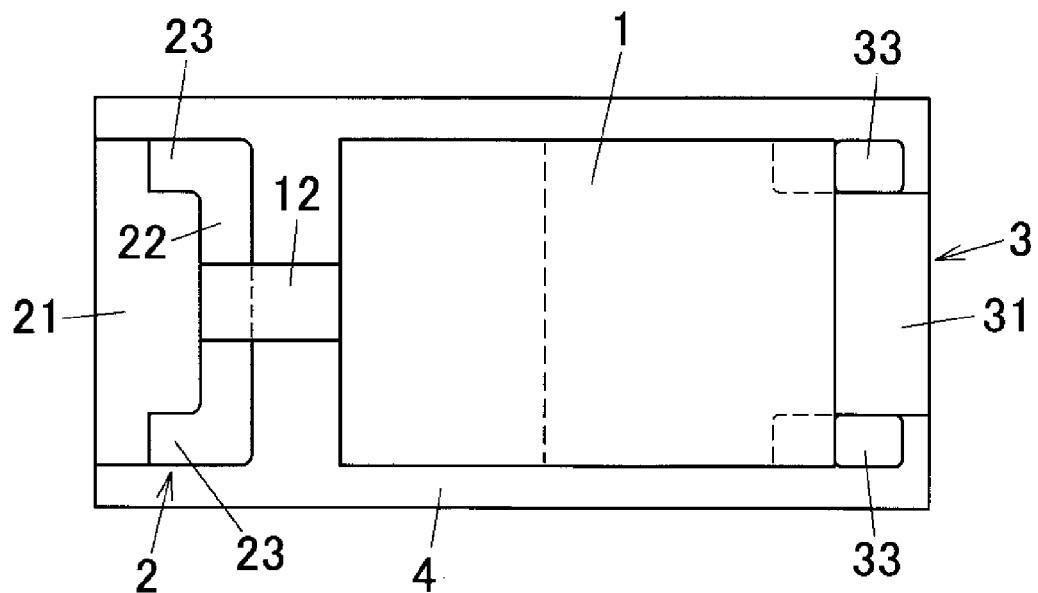
FIG. 1A is a plan view of a solid electrolytic capacitor of an embodiment of the present invention.
Figure 1B:
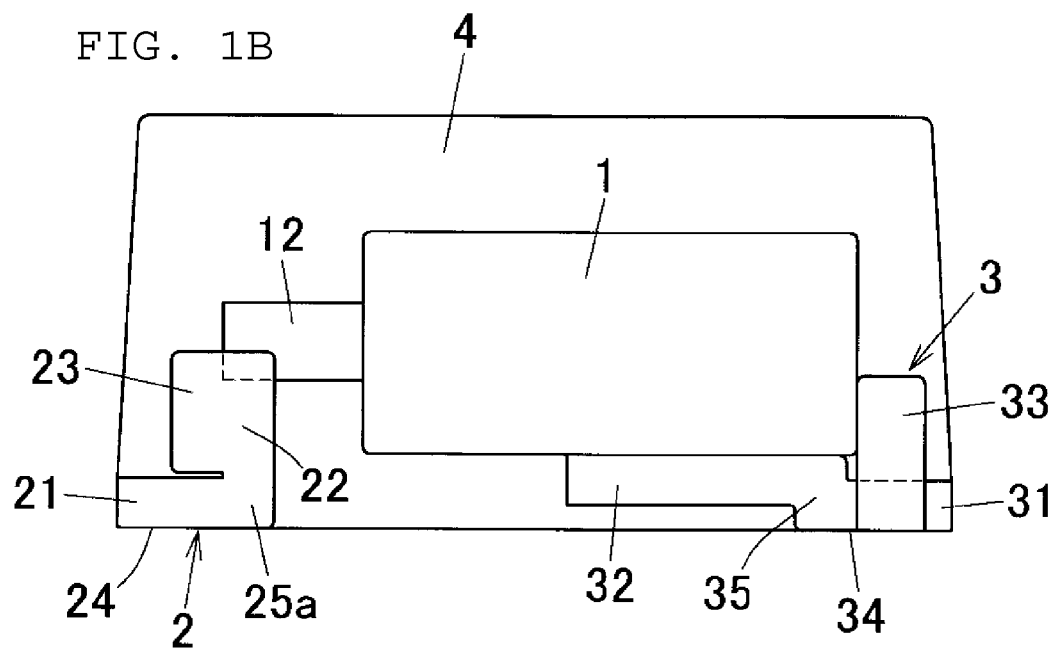
FIG. 1B is a side view of the solid electrolytic capacitor of the embodiment.

FIG. 1A is a plan view showing a solid electrolytic capacitor of an embodiment of the present invention, and FIG. 1B is a side view thereof. As illustrated in both figures, the solid electrolytic capacitor includes, as the basic structural elements, a capacitor element 1, a positive electrode lead terminal 2, a negative electrode lead terminal 3, and an exterior sealing element 4. In the following explanation, in order to facilitate understanding of the invention, the left hand side of the paper showing FIG. 1 denotes a "front side", the right side thereof denotes a "rear side", the up-and-downward direction thereof denotes a "both side direction (width direction)", and the up-and-downward direction of the paper showing FIG. 2 denotes a "up-and-downward direction".

Figure 5:
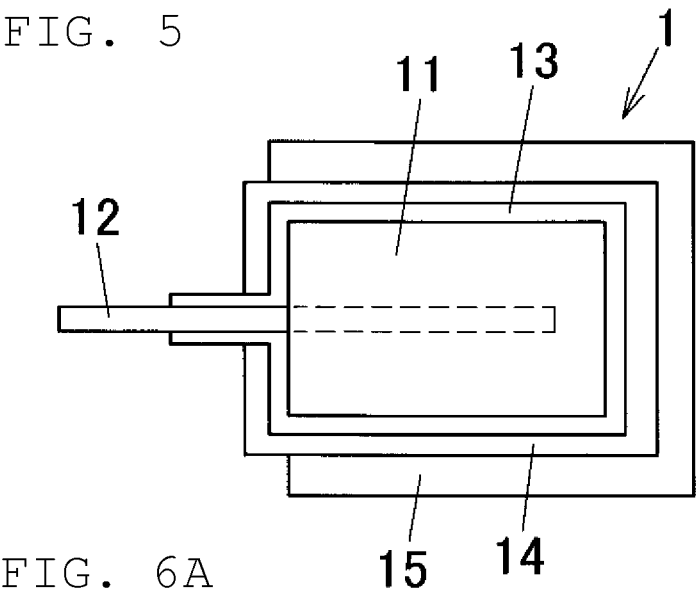
FIG. 5 is a side cross-sectional view showing a capacitor element applied to the solid electrolytic capacitor of the embodiment.

As shown in FIG. 5, the capacitor element 1 includes a sintered body 11 of Ta (tantalum) as a positive electrode. A positive electrode lead wire 12 is arranged in the sintered body 11 along the central axis thereof, and a part (front portion) of the positive electrode lead wire 12 is arranged to protrude forward from the front end face of the sintered body 11. Furthermore, the outer circumference of the sintered body 11 is covered by a dielectric layer 13 of an oxide film, and a semiconductor layer 14 made of conductive polymer such as polypyrrole, except for a tip end portion of the positive electrode lead wire 12, and the outermost circumference thereof is further covered by a negative electrode layer 15 made of a carbon paste layer and a silver paste layer.

Figure 2A:
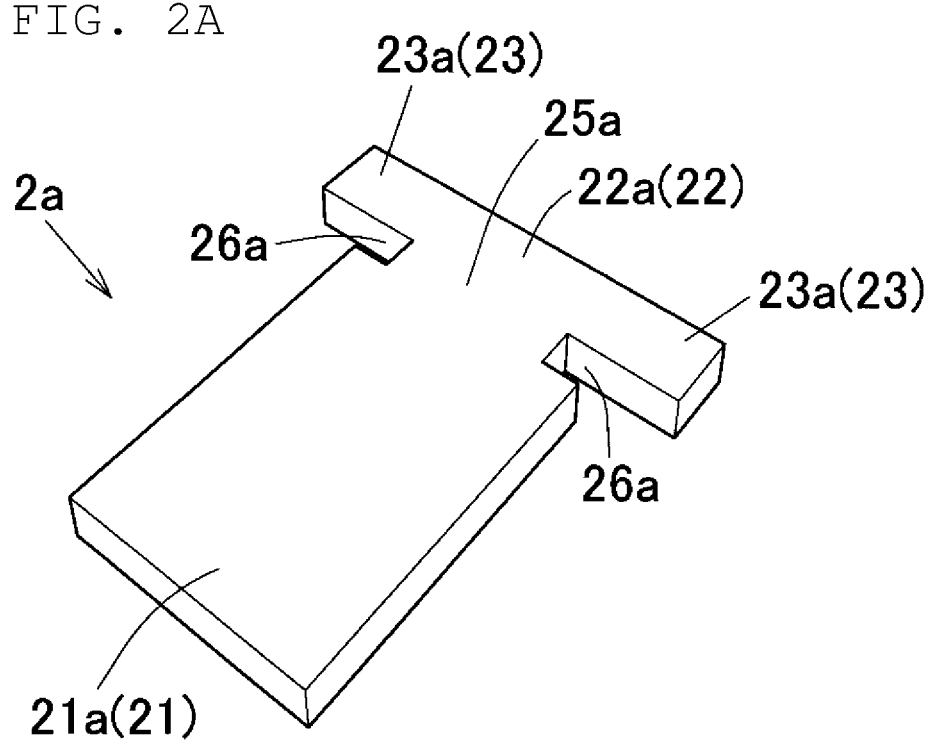
FIG. 2A is a perspective view showing a positive electrode lead terminal forming developed product used for manufacturing a solid electrolytic capacitor of the embodiment.
Figure 2B:
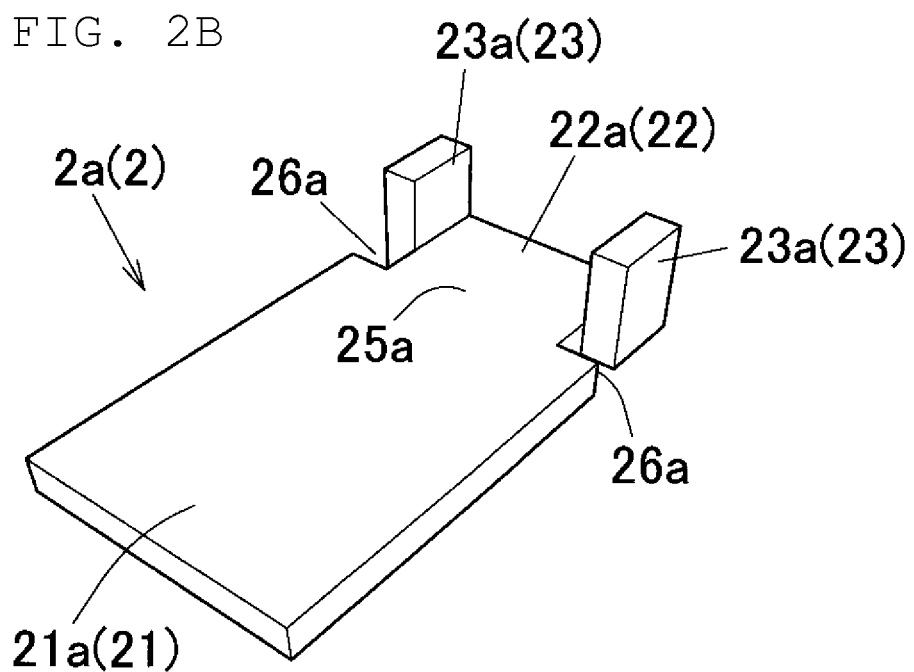
FIG. 2B is a perspective view showing the positive electrode lead terminal forming developed product of the embodiment in a partially bent state.
Figure 2C:
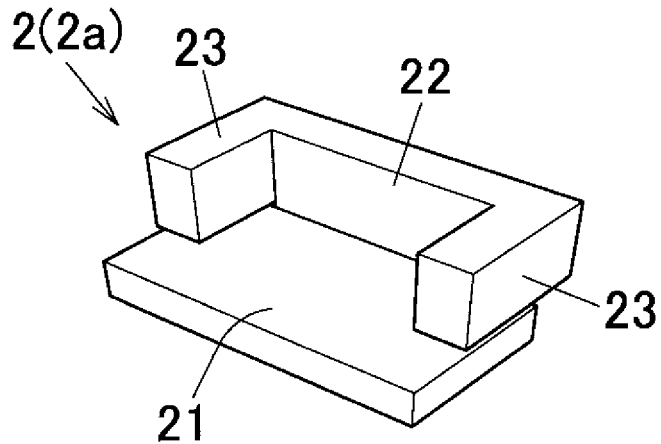
FIG. 2C is a perspective view showing a positive electrode lead terminal applied to the solid electrolytic capacitor of the embodiment.

As shown in FIGS. 1 and 2C, the positive electrode lead terminal 2 is integrally provided with a tabular positive electrode base frame 21 arranged horizontally to extend forward from the lower surface in front of the exterior sealing element 4, a raised connecting piece 22 arranged to perpendicularly extend upward from the rear end edge of the positive electrode base frame 21 and arranged parallel to the front end face of the capacitor element 1, and reinforcing pieces 23 and 23 arranged to extend rearward from both side edges of the raised connecting piece 22 and arranged parallel to both side surfaces of the exterior sealing body 40. The lower surface of the positive electrode base frame 21 is arranged to expose to the outside of the exterior sealing element 4 and constructed as a terminal exposed portion 24.

The tip edge (upper edge) of the raised connecting piece 22 of the positive electrode lead terminal 2 having the aforementioned structure is secured to the positive electrode lead wire 12 by welding in an electric contact manner.

Figure 3A:
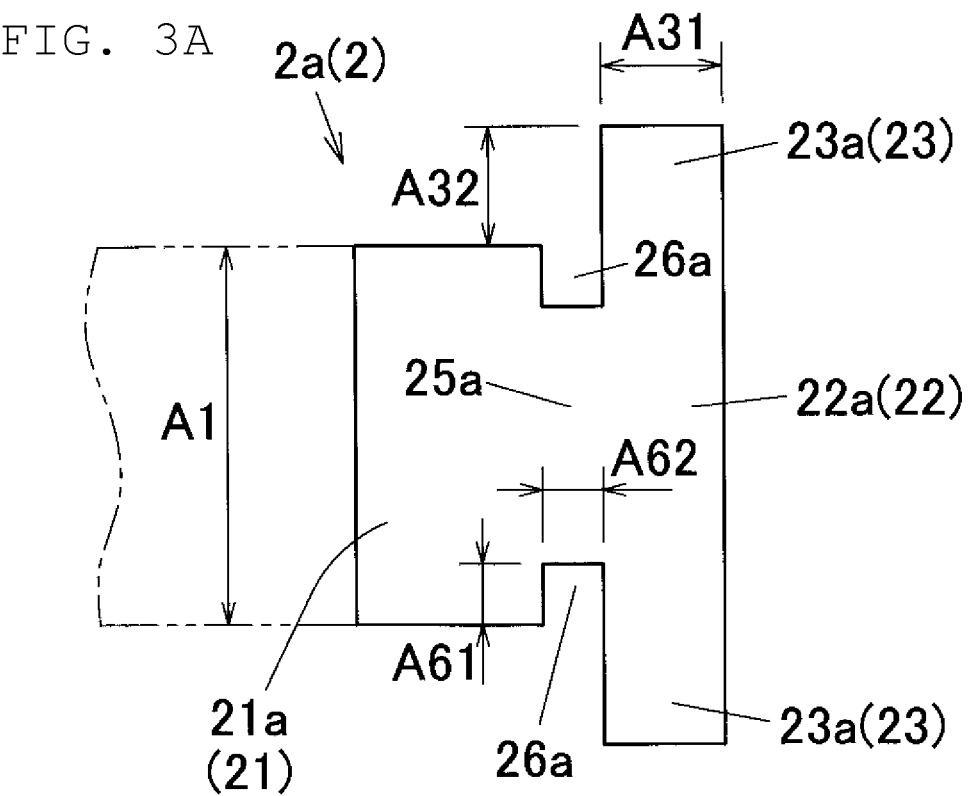
FIG. 3A is a plan view showing the positive electrode lead terminal forming developed product of the embodiment.

In this embodiment, as illustrated in FIGS. 2A and 3A, the positive electrode lead terminal 2 is a member obtained by bending a developed product (blank product 2a) produced by punching out an original plate. This expanded product 2a is provided with a positive electrode base frame forming region 21a corresponding to the positive electrode base frame 21, a raised connecting piece forming region 22a integrally formed on the rear edge of the positive electrode base frame forming region 21a so as to extend rearward, and reinforcing piece forming regions 23a and 23a integrally formed on both side edges of the raised connecting piece forming regions 22a. Furthermore, in this developed product 2a, a bending portion 25a is provided between the positive electrode base frame forming region 21a and the raised connecting piece forming region 22a, and both side edge portions of the bending portion 25a are partially cut out to form rectangular-shaped (square-shaped) cutout concave portions 26a and 26a.

In this embodiment, the developed product 2a is bent in the following order. First, as illustrated in FIG. 2B, the reinforcing piece forming regions 23a and 23a of the developed product 2a are bent upward by 90 degrees with respect to the raised connecting piece forming region 22a. After that, as illustrated in FIG. 2C, the raised connecting piece forming region 22a is bent upward by 90 degrees at the position of the bending portion 25a with respect to the positive electrode base frame forming region 21a. Thus, the electrode lead terminal 2 having the aforementioned structure is produced.

In this embodiment, when subjecting the developed product 2a to the bending work, by initially bending the reinforcing piece forming regions 23a and 23a and then bending the raised connecting piece forming region 22a, the bending work can be preformed effectively.

In other words, in subjecting the developed product 2a to bending work, if the raised connecting piece forming region 22a is initially bent upward, the reinforcing piece forming regions 23a are raised at the same time to be arranged vertically. Therefore, it is required to bend the vertically arranged reinforcing piece forming regions 23a backward with respect to the vertically raised connecting piece 22. In other words, in bending the raised connecting piece forming region 22a, the bending work in the upward direction (longitudinal direction) is performed, and in bending the reinforcing piece forming regions 23a, the bending work in the rear direction (lateral direction) is performed. Therefore, it is required to perform bending works different in direction, i.e., in the longitudinal direction and in the lateral direction, which may cause difficulty in performing smooth bending work.

Therefore, in this embodiment, by initially bending the reinforcing piece forming regions 23a, only the single bending work in the upward direction (in the vertical direction) enables bending works of the reinforcing piece forming regions 23a and the raised connecting piece forming region 22a. As explained above, the electrode lead terminal 2 as a bent formed product can be produced only by longitudinal one directional bending works with respect to the developed product 2a, enabling a smooth and effective bending work, which in turn can improve the productivity.

Needless to say, in the present invention, the manufacturing method including, e.g., the manufacturing order of the positive electrode lead terminal 2, is not specifically limited, and the positive electrode lead terminal can be produced in any manufacturing method.

Figure 4:
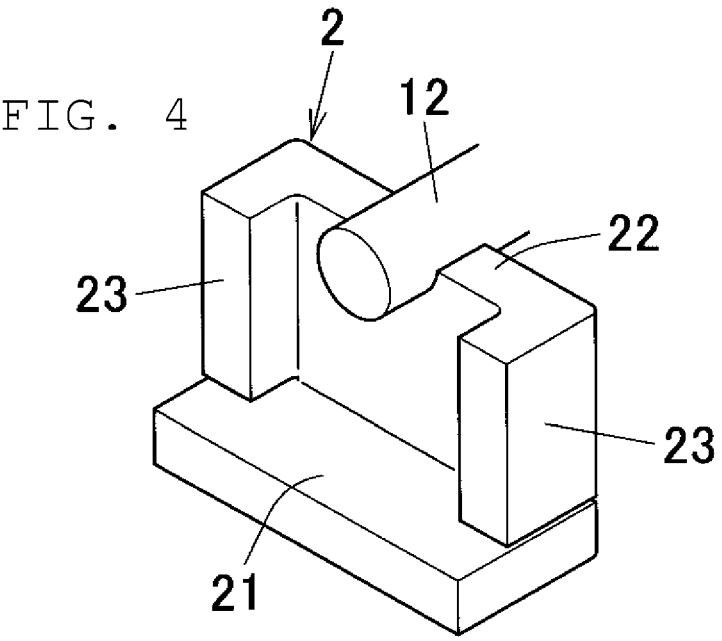
FIG. 4 is an enlarged perspective view showing the connection portion of the positive electrode lead wire and the positive electrode lead terminal of the embodiment.

A positive electrode lead wire 12 of the capacitor element 1 is secured to the tip edge (upper edge) of the raised connecting piece 22 of the positive electrode lead terminal 2 obtained as mentioned above. In this embodiment, the positive electrode lead wire 12 is secured to the tip edge of the raised connecting piece 22 by spot welding. The width of the raised connecting piece 22 is as extremely thin as about 100 μm, and therefore, as illustrated in FIG. 4, the lead wire welding position of the raised connecting piece 22 is dented, and the positive electrode lead wire 12 is welded to the raised connecting piece 22 with the wire fitted in the dented portion at the time of spot welding. For this reason, the positive electrode lead wire 12 is secured in a strongly stable manner with respect to the raised connecting piece 22. Thus, for example, at the time of forming the exterior sealing element (at the time of molding sealing resin), it is possible to effectively prevent the positive detachment of the electrode lead wire 12 from the raised connecting piece 22 causing a poor connection (open fault).

In this embodiment, the fit-in amount of the positive electrode lead wire 12 with respect to the raised connecting piece 22 is preferably adjusted to 2/5 to 3/4 of the outer diameter (diameter) of the positive electrode lead wire 12. In other words, when the fit-in amount is insufficient, the possibility of causing the open fault increases. To the contrary, when the fit-in amount is excessive, the pressing force required for securing the lead wire 12 to the raised connecting piece 22 becomes too large, which may cause harmful deformations of the raised connecting piece 22 and peripheral portion thereof.

At the time of performing the aforementioned spot welding, the positive electrode lead wire 12 is kept in pressure contact with the raised connecting piece 22, therefore, the pressure contact causes a force of deforming the raised connecting piece 22. In this embodiment, since the reinforcing pieces 23 are formed on both sides of the raised connecting piece 22, the force acting on the raised connecting piece 22 is assuredly received by the positive electrode base frame 21 via the reinforcing pieces 23 and 23. For this reason, the raised connecting piece 22 can be prevented from unintentionally being deformed, at the time of, e.g., forming the exterior sealing element, it is possible to assuredly prevent the positive electrode lead wire 12 from detaching from the raised connecting piece 22 to cause an open fault therebetween, which results in high operational reliability.

In addition, in this embodiment, the positive electrode lead wire 12 is secured to the raised connecting piece 22 by spot welding. In the present invention, however, the welding means is not limited to that, and the securing of the positive electrode lead wire 12 to the raised connecting piece 22 can be performed by other securing means, such as, e.g., resistance welding, laser welding, and pressure bonding.

As illustrated in FIG. 1, the negative electrode lead terminal 3 is integrally provided with a tabular negative electrode base frame 31 arranged horizontally to extend rearward from a lower surface of a rear portion of the exterior sealing element 4, a tabular connecting piece 32 arranged along the lower surface of the capacitor element 1 in such a way as to be lifted upward from the lower end of the exterior sealing element 4, a linking piece 35 connecting between the tabular connection piece 32 and the negative electrode base frame 31, and both side guide pieces 33 and 33 raised upward from both side edges of the negative electrode base frame 31 and arranged along both sides of the rear edge face of the capacitor element 1. Furthermore, the bottom surface and rear side portion of the negative electrode base frame 31 are arranged in such a manner as to be exposed to the outside of the exterior sealing element 4. This exposed portion is constituted as a terminal exposed portion 34.

The lower surface of the capacitor element 1 is secured to the upper surface of the tabular connecting piece 32 of the negative electrode lead terminal 3 having the aforementioned structure with silver paste adhesive, and both side guide pieces 33 and 33 are arranged along both sides of the rear end face of the capacitor element 1.

Figure 3B:
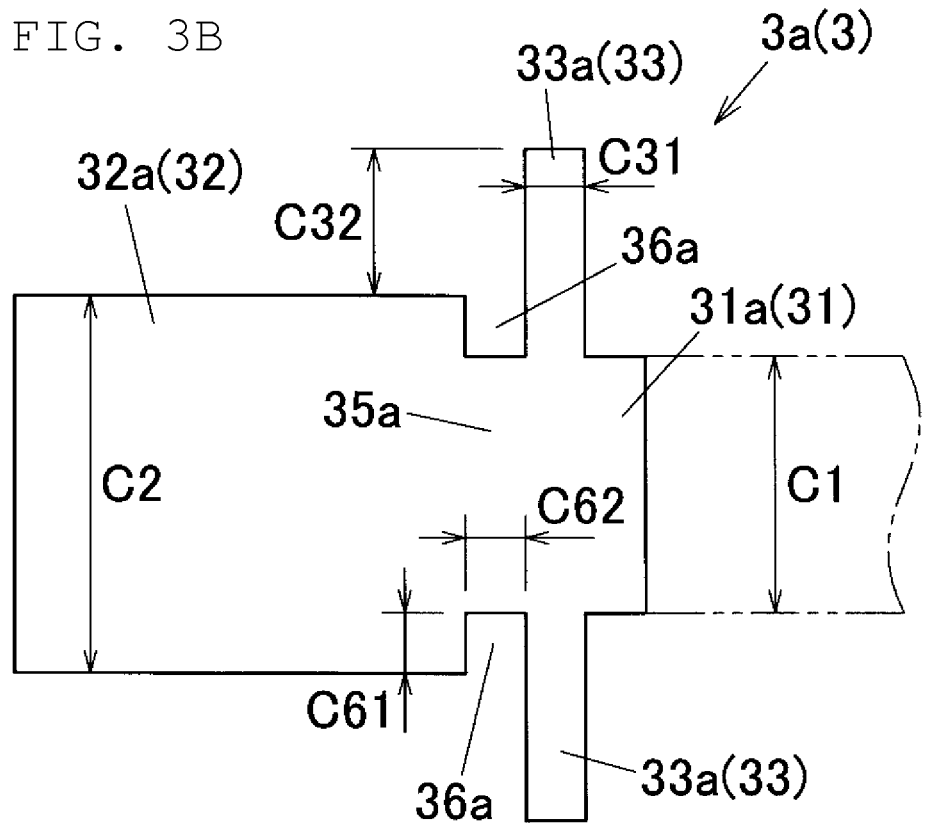
FIG. 3B is a plan view showing the positive electrode lead terminal forming developed product used in manufacturing the solid electrolytic capacitor of the embodiment.

In this embodiment, as illustrated in FIG. 3B, the negative electrode lead terminal 3 is a member obtained by bending a developed product (blank product 3a) produced by punching out an original plate. This developed product 3a is provided with a negative electrode base frame forming region 31a corresponding to the negative base frame 31, a linking piece forming region 35a integrally formed at the front edge of the negative electrode base frame forming region 31a, a flat connecting piece forming region 32a integrally formed at the front edge of the linking piece forming region 35a so as to extend forward. Furthermore, on both side edge portions of the linking piece forming region 31a, cutout concave portions 36a and 36a are formed by partially cutting out the side edge portions.

In the developed product 3a having the abovementioned structure, by bending both side guide piece forming regions 33a and 33a upward and bending front and rear side edges of the linking piece forming region 35a so that the flat connecting piece forming region 32a is pushed upward by a prescribed amount. Thus, the negative electrode lead terminal 3 having the aforementioned structure is produced.

The lower surface of the capacitor element 1 is secured on the upper surface of the flat connecting piece 22 of the negative electrode lead terminal 3 obtained as mentioned above by silver paste adhesive. At this time, both side guide pieces 33 and 33 of the positive electrode lead terminal 3 are arranged vertically along the rear end surface of the capacitor element 1 in a manner such that the guide pieces 33 are in contact with both sides of the rear surface of the capacitor element 1.

In this embodiment, the capacitor element 1 having the lead terminals 2 and 3 are molded with epoxy resin as synthetic resin except for the terminal exposed portions 24 and 34 of the lead terminals 2 and 3 to form the exterior sealing element 4. Thus, the solid electrolytic capacitor is produced.

In this embodiment, the terminal exposed portions 24 and 34 of the lead terminals 2 and 3 constitute a part of the lead terminals.

The raised connecting piece forming region 22a of the positive electrode lead terminal forming developed product 2a constitutes the portion connected to the edge of the positive electrode base frame, and the reinforcing piece forming regions 23a constitute the portions connected to both side edges of the raised connecting piece. Furthermore, the guide piece forming regions 32a of the negative electrode lead terminal forming developed product 3a constitute the portions connected to both side edges of the negative base frame.

In addition, as illustrated by the two-dot chain line in FIGS. 3A and 3B, the base frame regions 21a and 31a of the positive and negative electrode lead terminal forming developed products 2a and 3a are formed longer than the base frames 21 and 31 of the solid electrolytic capacitor of the final product, but the extended portion is cutoff as needed.

As described above, according to the solid electrolytic capacitor of this embodiment, the raised connecting piece 22 is formed at the rear end edge of the positive electrode lead terminal 2 in an upwardly raised manner, and the positive electrode lead wire 12 of the capacitor element 1 is connected to the upper end edge of the raised connecting piece 22. Therefore, both of them can be connected in a point contact manner, which reduces the contact area. Therefore, the mounting space for the capacitor element 1 can be increased, resulting in an increased capacitance.

Furthermore, in this embodiment, because the reinforcing pieces 23 are provided between both side portions of the raised connecting piece 22 and both side portions of the positive electrode base frame 21, the force applied to the raised connecting piece 22 in a direction pressing the raised connecting piece 22 downward can be received by the positive electrode base frame 21 via the reinforcing pieces 23, which assuredly prevents possible harmful deformation of the raised connecting piece 22. Therefore, the possible deformation of the raised connecting piece 22 can be assuredly prevented due to the pressure applied when welding and securing the positive electrode lead wire 12 to the raised connecting piece 22. As a result, a possible poor connection between the raised connecting piece 22 and the positive electrode lead wire 12 can be assuredly prevented from occurring at the time of forming the exterior sealing element 4.

Also, in this embodiment, the raised connecting piece 22 of the positive electrode lead terminal 2 is formed by bending the raised connecting piece forming region 22a upward, which enables easy forming of the raised connecting piece 22 by the bending work.

Furthermore, the cutout concave portions 26a and 26a are formed on both side edge portions of the bending portion 25a between the positive electrode base frame 21 and the raised connecting piece 22, enabling assured bending work at the bending portion 25a, which in turn can assuredly form the raised connecting piece 22.

Also, in this embodiment, because the reinforcing pieces 23 are formed by bending, the reinforcing pieces 23 can be easily formed in the same manner as mentioned above.

In this embodiment, the anchoring effect (pull-out prevention effect) by both side reinforcing pieces 23 with respect to the exterior sealing element 4 as a sealing resin enables strong stable securing of the positive electrode lead terminal 2 to the exterior sealing element 4, which assuredly prevents the positive electrode lead terminal 2 from sliding off from the exterior sealing element 4. Especially in the case of a bottom surface electrode type solid electrolytic capacitor in which the terminal exposed portion 24 of the positive electrode base frame 21 exposed downward as described in this embodiment, the positive electrode lead terminal 2 can be effectively prevented from sliding out and/or falling down by the anchoring effect by the reinforcing pieces 23.

Also, in this embodiment, the guide piece 33 and 33 are formed on both side edges of the negative base frame 31 of the negative electrode lead terminal 3 in an upwardly raised manner, and the guide piece 33 and 33 are arranged along both sides of the rear surface of the capacitor element 1. Therefore, the guide piece 33 and 33 prevent the positional displacements of the capacitor element 1, further improving the product quality.

Furthermore, in this embodiment, the anchoring effect (pull-out prevention effect) by the guide piece 33 and 33 enables strong and assured securing of the negative electrode lead terminal 3 to the exterior sealing element 4, which in turn can assuredly prevent the negative electrode lead terminal 3 from sliding off from the exterior sealing element 4. Especially in the case of a bottom surface electrode type solid electrolytic capacitor as described in this embodiment, the anchoring effect of the guide pieces 33 can effectively prevent the positive electrode lead terminal 3 from sliding off and/or falling down.

Furthermore, in this embodiment, the positive electrode lead wire 12 is connected to the upper end of the raised connecting piece 22 arranged vertically, and the terminal exposed portion 24 of the positive electrode base frame 21 is formed at the lower end of the raised connecting piece 22. Therefore, the lead terminal member can be lead linearly to the lower end surface of the exterior sealing element 4 from the positive electrode lead wire 12. This simplifies the wiring structure of the lead terminal member, reducing the wiring arrangement of the electrode to reduce the electrical resistance and simplify the structure, which can attain high performance and reduction in size and weight.

Figure 6A:
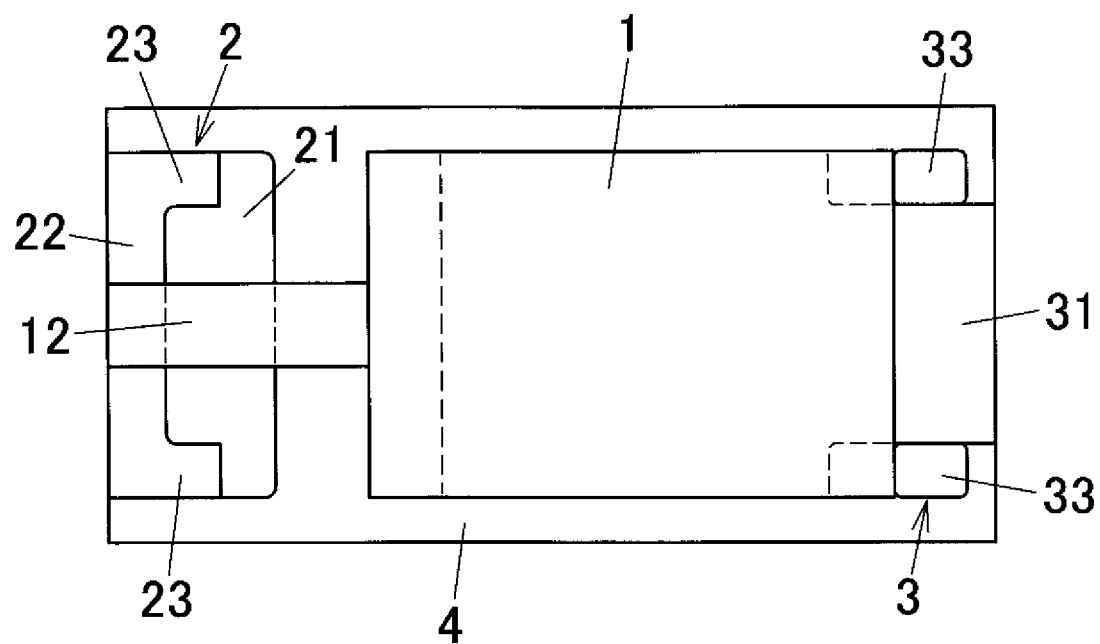
FIG. 6A is a plan view showing the solid electrolytic capacitor of a first modified embodiment of the present invention.
Figure 6B:
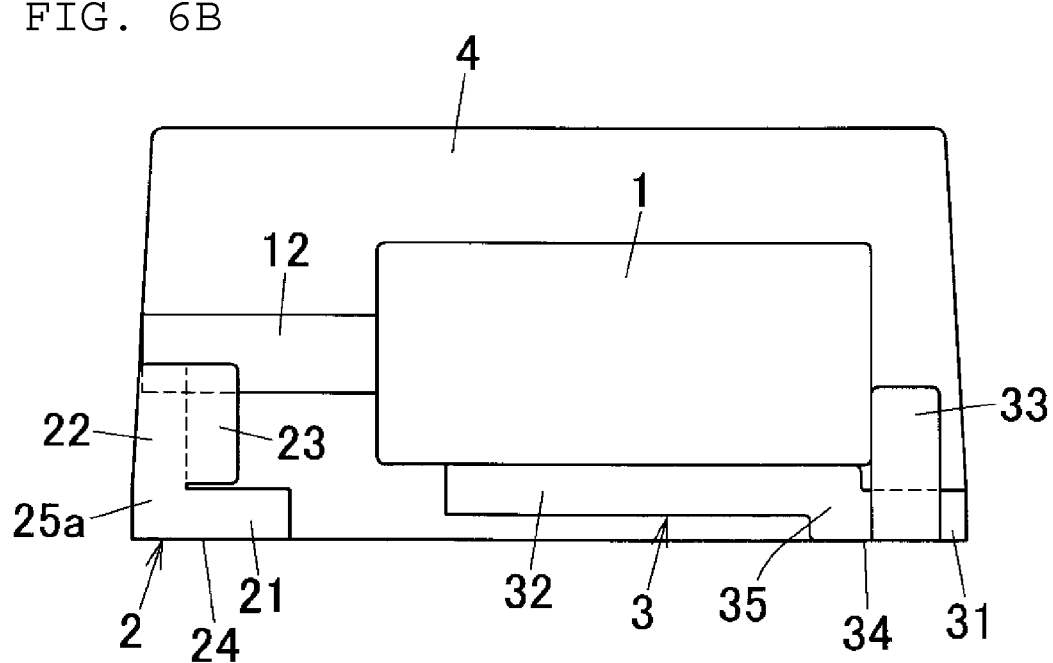
FIG. 6B is a side view showing the solid electrolytic capacitor of the first modified embodiment.

FIGS. 6A and 6B are drawings showing a solid electrolytic capacitor according to a first modified embodiment of the present invention. As illustrated in both figures, in this solid electrolytic capacitor of this modified embodiment, raised connecting piece 22 is formed at the front edge of the positive electrode base frame 21 of the positive electrode lead terminal 2 by upward bending, while reinforcing pieces 23 and 23 are formed at both side portions of the raised connecting piece 22 by upward bending. In the same manner as in the abovementioned embodiment, the positive electrode lead wire 12 is secured to the upper edge of the raised connecting piece 22 by spot welding.

In this modified embodiment, the other structures are essentially the same as those of the abovementioned embodiment, and therefore, duplicate explanations will be omitted by allotting the same symbols to the corresponding portions.

The solid electrolytic capacitor can exert the same or similar functions and effects in the same manner as mentioned above.

Figure 7A:
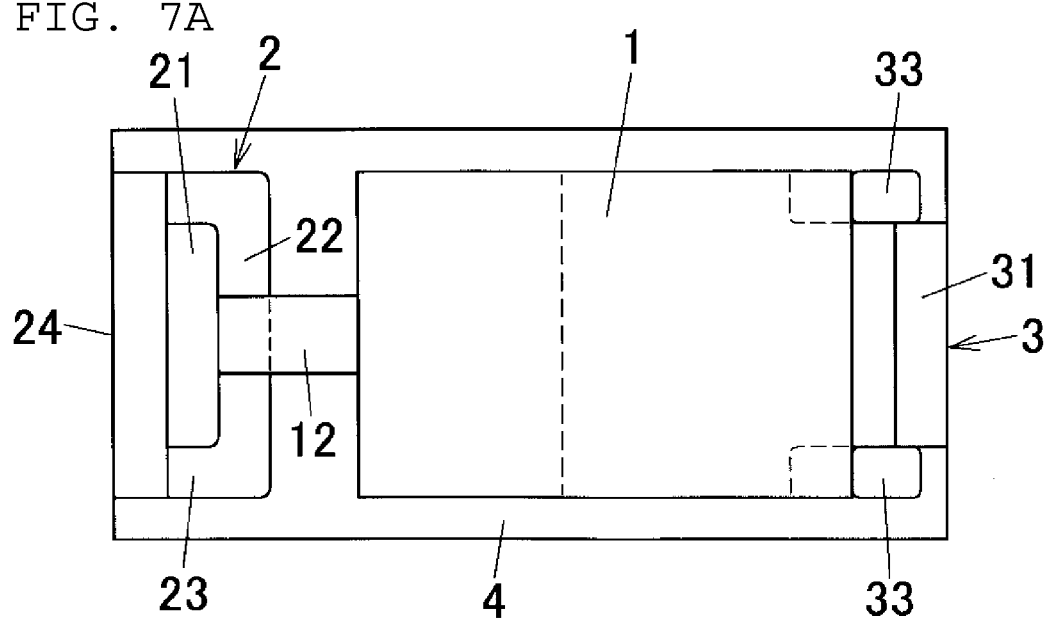
FIG. 7A is a plan view showing a solid electrolytic capacitor of the second modified embodiment of the present invention.
Figure 7B:
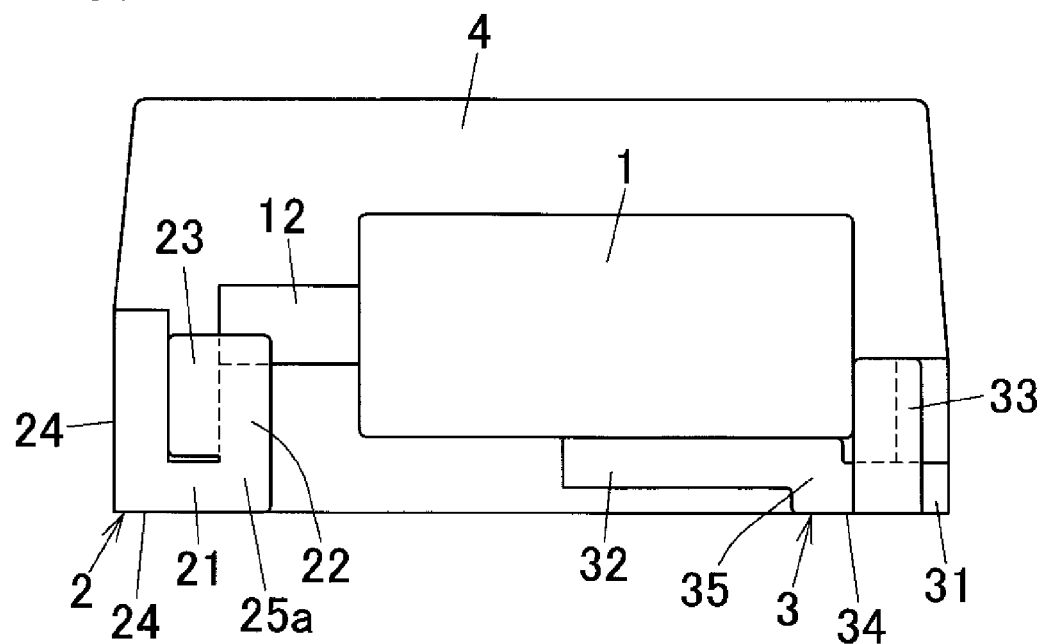
FIG. 7B is a side view showing the solid electrolytic capacitor of the second modified embodiment.

FIGS. 7A and 7B are drawings illustrating a solid electrolytic capacitor of a second modified embodiment of the present invention. As illustrated in both figures, in the solid electrolytic capacitor of this modified embodiment, an exposed terminal portion 24 is formed on the front end edge of the positive electrode base frame 21 of the positive electrode lead terminal 2 by upward bending, while the terminal exposed portion 34 is formed on the rear end edge of the negative electrode base frame 31 of the negative electrode lead terminal 3 by upward bending. And in this solid electrolytic capacitor, positive electrode side terminal exposed portions 24 and 24 are formed at the bottom surface and front end face of the exterior sealing element 4, and negative electrode side terminal exposed portions 34 and 34 are formed at the bottom surface and rear end face of the exterior sealing element 4.

In this modified embodiment, the other structures are essentially the same as those of the abovementioned embodiment, and therefore, duplicate explanations will be omitted by allotting the same symbols to the corresponding portions.

Further, in the abovementioned embodiments, the terminal exposed portions 24 and 34 of the lead terminals 2 and 3 are arranged at the bottom surface and front and rear surfaces, but not limited thereto. In the present invention, the terminal exposed portions of the lead terminals can be arranged at the upper surface and/or both side surfaces.

Also, in the aforementioned embodiments, the guide pieces 33 of the negative electrode lead terminal 3 are arranged along the rear end face of the capacitor element 1, but not limited thereto. In the present invention, the guide pieces 33 of the positive lead terminal 3 can be arranged along both side faces of the capacitor element 1.

Figure 8:
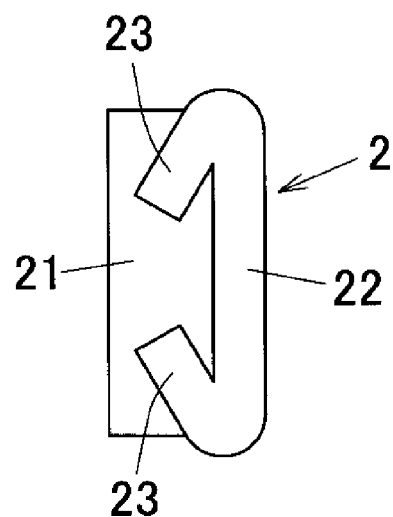
FIG. 8 is a plan view showing a modified embodiment of a positive electrode lead terminal capable of being applied to a solid electrolytic capacitor of the present invention.

Furthermore, in the abovementioned embodiments, the reinforcing pieces 23 of the positive electrode lead terminal 3 are formed by bending by 90 degrees with respect to the raised connecting piece 22, but not limited thereto. In the present invention, as illustrated in FIG. 8, the reinforcing pieces 23 can be formed by bending by 90 degrees or more with respect to the raised connecting piece 22.

EXAMPLES

Hereinafter, Examples according to the present invention, and Comparative Examples deviating from the gist of the present invention will be explained in detail.

Example 1

A solid electrolytic capacitor having a similar structure as the abovementioned embodiment was produced.

First, as a capacitor element 1, a capacitor element having a length of 0.95 mm, a width of 0.63 mm, and a height of 0.53 mm, and an outer diameter Φ of the positive electrode lead wire 12 of 0.15 mm was used.

As the positive lead terminal 2 and the negative electrode lead terminal 3, positive and negative electrode terminal forming developed products 2*a* and 3*a* each obtained by punching out an original plate in which nickel plating and tin plating were performed to a copper alloy plate member having a thickness of 0.1 mm (100 μm) were used.

That is, as illustrated in FIG. 3A, in the positive electrode lead terminal forming developed product 2*a*, the width A1 of the positive electrode base frame forming regions 21*a* was set to 0.63 mm, the height A31 of the raised connecting piece forming region 22*a* and the reinforcing piece forming region were each set to 0.2 mm, and the length A32 of the reinforcing piece forming region 23*a* was set to 0.2 mm. At both sides between the positive electrode base frame forming region 21*a* and the raised connecting piece forming region 22*a*, which is a bending portion 25*a*, rectangular cutout concave portions 26 and 26 each having a depth A61 of 0.1 mm and a width A62 of 0.1 mm were formed. The developed product 2*a* was subjected to bending work in the same manner as in the aforementioned embodiment to obtain the positive electrode lead terminal 2.

As illustrated in FIG. 3B, in the negative electrode lead terminal forming developed product 3*a*, the width C1 of the positive electrode base frame forming regions 31*a* was set to 0.43 mm, the width C2 of the flat connecting piece forming region 32*a* was set to 0.63 mm, and the width C31 of the guide piece forming region 33*a* and the height C32 of the guide piece forming region 33*a* were each set to 0.23 mm. At both sides between the flat connecting piece forming region 32*a* and the negative electrode base frame forming region 31*a*, i.e., at both sides of the linking piece region 35*a*, rectangular cutout concave portions 36 and 36 having a depth C61 of 0.1 mm and a width C62 of 0.1 mm were formed. The developed product 3*a* was subjected to bending work in the same manner as in the aforementioned embodiments to obtain a negative electrode lead terminal 3.

A positive electrode lead wire 12 of the capacitor element 1 was arranged on the upper end edge of the raised connecting piece 22 of the positive electrode lead terminal 2 having the aforementioned structure, and was secured using a spot welding machine (a precision resistance welding machine made by HIMACS, Ltd.) with an applied pressure of 4.9 Pa. At this time, as illustrated in FIG. 4, the positive electrode lead wire 12 was fit into a dent of the raised connecting piece 22 by about ⅔ of the outer diameter of the lead wire 12.

Also, a lower surface side of negative electrode layer 15 of the capacitor element 1 was secured to the upper surface of the flat connecting piece 32 of the negative electrode lead terminal 3 by silver paste adhesive.

The capacitor element having lead terminals obtained as mentioned above was set to a predetermined mold, and epoxy resin was injected to predetermined regions by a transfer molding method to thereby form an exterior sealing element 5. After sealing with resin, the capacitor element was subjected to aging. Thus, a solid electrolytic capacitor (rated voltage of 6.3 V, capacity of 15 μF) of Example 1 having a similar structure as the abovementioned embodiment was produced.

Comparative Example 1

Figure 9:
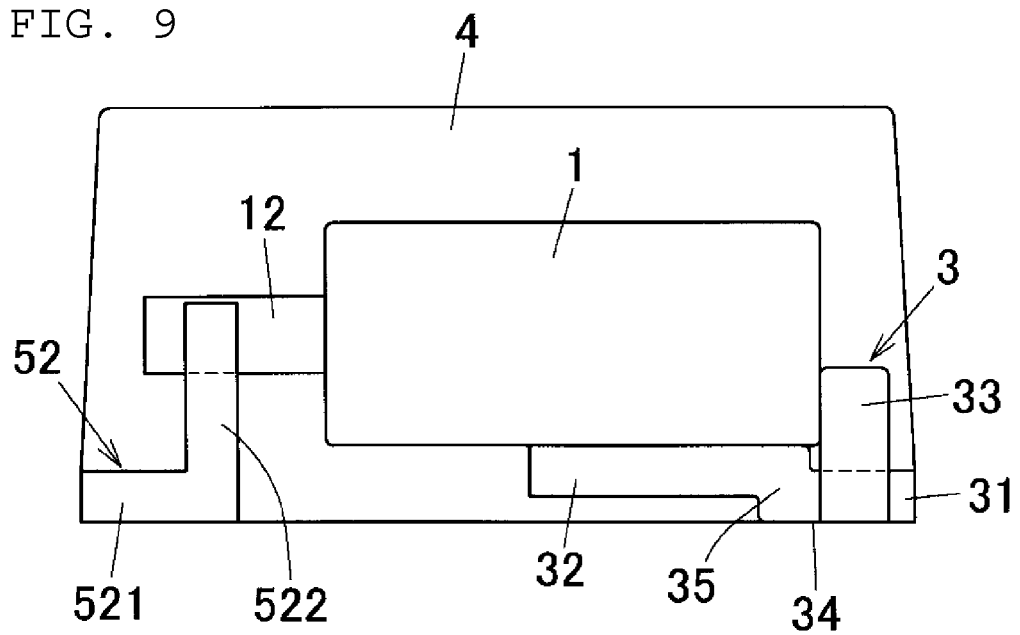
FIG. 9 is a side view showing a solid electrolytic capacitor of a Comparative Embodiment 1 which is in a comparison relationship with the present invention.
Figure 10:
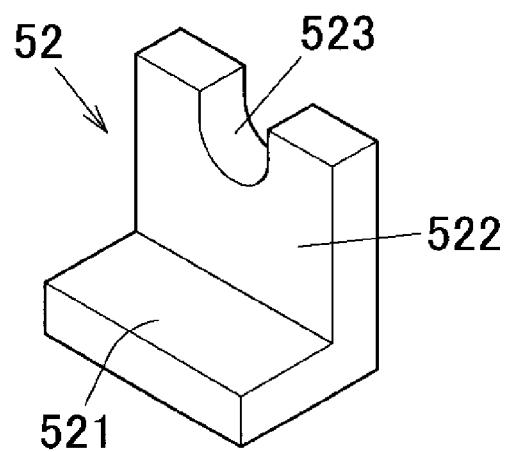
FIG. 10 is a perspective view showing a positive electrode lead terminal applied to the solid electrolytic capacitor of Comparison Example 1.

As illustrated in FIGS. 9 and 10, as a positive electrode lead terminal 52, a positive electrode lead terminal having a L-shaped raised connecting piece 522 formed by upward bending on the rear end edge of a positive electrode base frame 521 was prepared. On the upper end edge of the raised connecting piece 522, a V or U-shaped groove 523 for securing a positive electrode lead wire 12 in a fitted manner was formed. Needless to say, in this positive electrode lead terminal 52, reinforcing pieces 23 and cutout concave portions 26 similar to those of the aforementioned Example 1 were not formed.

A solid electrolytic capacitor of Comparative Example 1 was produced essentially in the same manner as in Example 1 except that a positive electrode lead terminal 52 having the aforementioned structure was used.

Comparative Example 2

Figure 11:
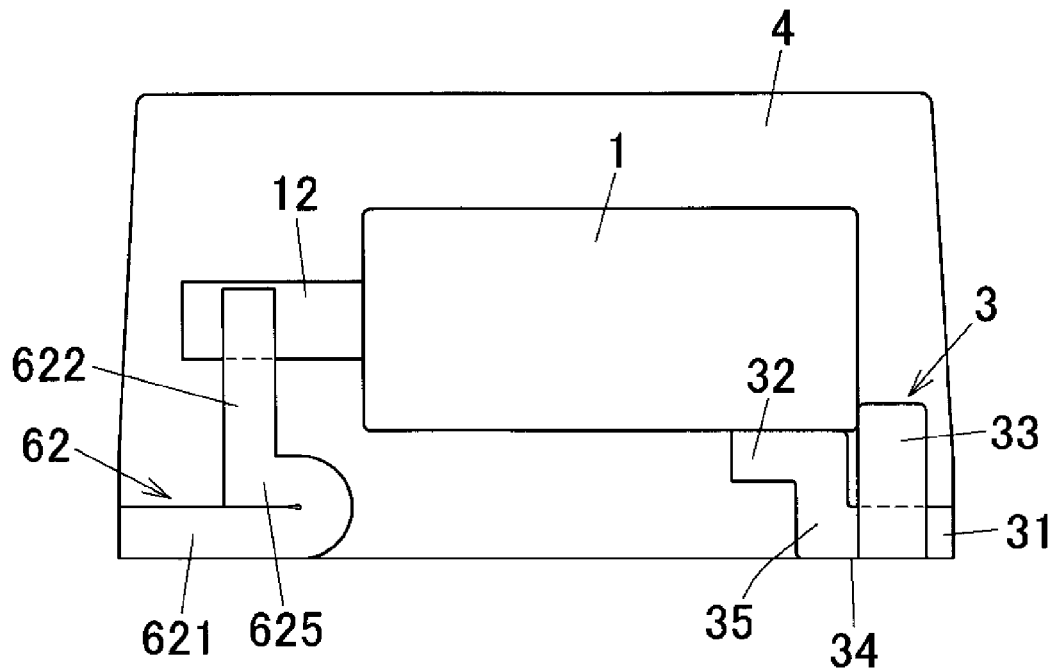
FIG. 11 is a side view showing a solid electrode electrolytic capacitor of Comparison Example 2 which is in a comparative relationship with the present invention.

As illustrated in FIG. 11, as a positive electrode lead terminal 62, a positive electrode lead terminal having a backwardly folded piece 625 at the rear end edge of the positive electrode base frame 621 formed by backward folding and a raised connecting piece 622 formed at the front end edge of the backwardly folded member piece 625 was prepared. In this positive electrode lead terminal 62, in the same manner as in Comparative Example 1, a positive electrode lead wire 12 was to be secured on the upper end edge of the raised connecting piece 622.

A solid electrolytic capacitor of Comparative Example 2 was produced in the same manner as in Comparative Example 1 except that the positive electrode lead terminal 62 having this structure was used.

Comparative Example 3

Figure 12:
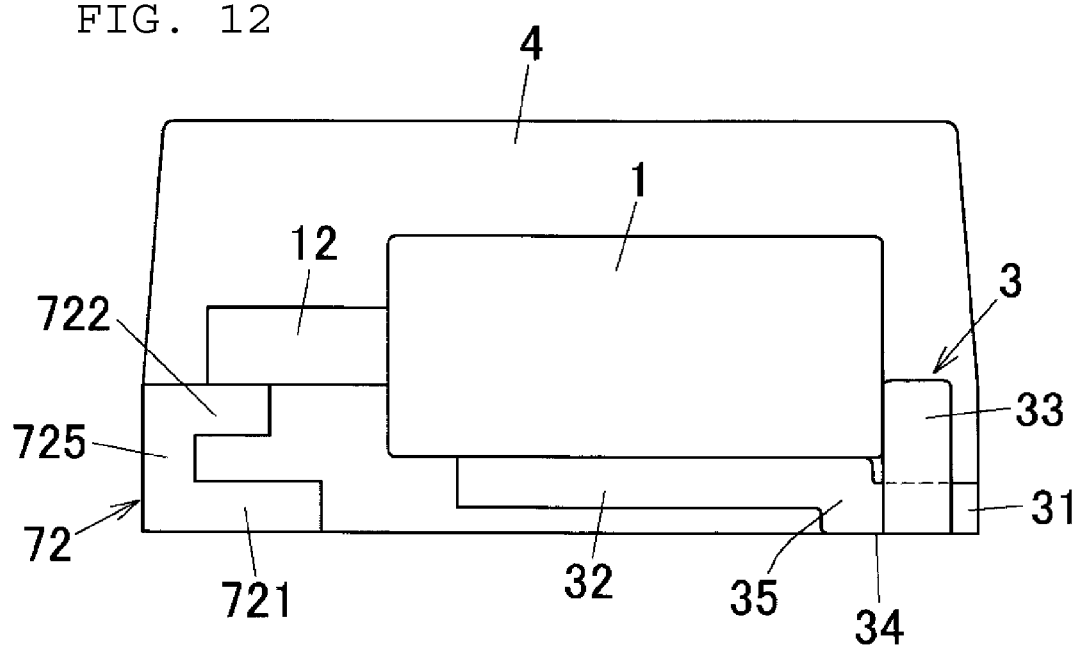
FIG. 12 is a side view showing a solid electrode electrolytic capacitor of Comparison example 3 which is in comparative relationship with the present invention.

As illustrated in FIG. 12, as a positive electrode lead terminal 72, a positive electrode lead terminal having a vertically raised piece 725 at the front end edge of the positive electrode base frame 721 formed by upward bending and a horizontal connecting piece 722 formed by bending so as to extend rearward from the upper end edge of the vertically raised piece 725 was prepared. In this positive electrode lead terminal 72, a positive electrode lead wire 12 was to be secured to the rear portion of the upper surface (flat surface) of the horizontal connecting piece 722.

A solid electrolytic capacitor of Comparative Example 3 was produced in the same manner as in Comparative Example 1 except that the positive electrode lead terminal 72 having this structure was used.

In this solid electrolytic capacitor, if a capacitor element which is similar to that of Example 1 or Comparative Examples 1 and 2 is used, the exterior sealing element (package 4) becomes larger than that of Example 1, which results in nonstandard. Therefore, a capacitor element 1 having a size (length: 0.7 mm, width: 0.63 mm, height: 0.43 m) smaller than the aforementioned Example and Comparative Examples was used.

<Evaluation>

TABLE 1

| | Capacitance (μF) | LC (μA) | ESL (nH) | ESR (mΩ) | Number of open faults |
|---|---|---|---|---|---|
| Example 1 | 16.2 | 3 | 0.3 | 88 | 0/38 |
| Comparative Example 1 | 15.8 | 7 | 0.3 | 214 | 4/38 |
| Comparative Example 2 | 16.0 | 3 | 0.3 | 340 | 24/38 |
| Comparative Example 3 | 9.6 | 3 | 0.7 | 117 | 0/38 |

Thirty eight (38) solid electrolytic capacitors (samples) were prepared for each of Example 1 and Comparative Examples 1 to 3. In each sample, the performances, such as, e.g., capacitance, LC (leakage current), ESL (equivalent series inductance), ESR (equivalent series resistance), and the number of open faults were measured. Table 1 shows the measured results.

In Table 1, each value of the performance is an average value of each sample of Example 1 and Comparative Examples 1 to 3. The capacitance, ESR, and ESL were measured by a device in which a test fixture made by Arumo Tech Corporation was connected to a LCR measuring instrument made by Agilent Technologies, Ltd.

The ESR was a value at 100 kHz, the ESL was a value at 1 MHz, and LC was a value at 6.3V, 30 seconds.

As it is apparent from Table 1, each capacitor except for Comparative Example 3 was similar in capacitance, ESL and LC, but ESR was worse in Comparative Example 1. It shows that, in a capacitor in which the positive electrode lead wire 12 was fitted into the V-groove 523 of the positive electrode lead terminal 52, because of the natural oxidation film and/or the dielectric layer formed on the surface of the positive electrode lead wire 12 by chemical conversion, it could not be connected with sufficiently low resistance.

Furthermore, in the capacitor of Comparative Example 1, when it was attempted to strongly connect the positive electrode lead wire 12 to the raised connecting piece 522 of the positive electrode lead terminal 52, the raised connecting piece 522 deformed, and many open faults occurred.

Also, in Comparative Example 2, in the same manner as in Comparative Example 1, ESR was deteriorated. It is considered that when a capacitor element 1 having the same size as that of Example was used, the positive electrode lead terminal 62 was formed into a reverse T shape, and by just that much, the lead terminal forming region at the negative electrode side was restricted to reduce the contact area of the positive electrode lead terminal and the capacitor element 1, which increased the resistance. Also in Comparative Example 2, in the same manner as in Comparative Example 1, many open faults occurred.

In the capacitor of Comparative Example 3, since the positive electrode lead wire 12 was in line contact with the positive electrode lead terminal 72, the contact area increased, and by just that much, the size of the capacitor element 1 was restricted. For that reason, only a small sized capacitor element 1 could be used, and therefore the capacitance was reduced.

In Comparative Example 3, since the lead terminal was bend along the package (exterior sealing element), the ESL was also increased.

To the contrary, in Example 1 according to the present invention, all of the values on capacitance, LC, ESL, and ESR were excellent. Among them, ESR was excellent, which meant that the positive electrode lead wire was electrically and mechanically sufficiently connected to the positive electrode lead terminal. This is because, when the positive electrode lead wire 12 was spot welded to the raised connecting piece 22 of the positive electrode lead terminal 2 as in Example 1, the connection was made by assuredly destroying the natural oxidation film and/or the dielectric layers formed on the positive electrode lead wire surface by the welding.

Furthermore, in Example 1, no open fault occurred. It is considered that in the capacitor of Example 1, reinforcing pieces 23 formed at both sides of the raised connecting piece 22 of the positive electrode lead terminal 2 increased the distortion bending resistance of the raised connecting piece 22 against the pressure acting from above, which prevented occurring of open faults.

This application claims priority to Japanese Patent Application No. 2008-335740 filed on Dec. 29, 2008, the entire disclosure of which is incorporated herein by reference in its entirety.

It should be understood that the terms and expressions used herein are used for explanation and have no intention to be used to construe in a limited manner, do not eliminate any equivalents of features shown and mentioned herein, and allow various modifications falling within the claimed scope of the present invention.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

INDUSTRIAL APPLICABILITY

The present invention can be used for a solid electrolytic capacitor in which the capacitor element is sealed by an exterior sealing element made of synthetic resin.

DESCRIPTION OF THE REFERENCE NUMERALS

1 . . . capacitor element
12 . . . positive electrode lead wire
15 . . . negative electrode layer
2 . . . positive electrode lead terminal
2a . . . positive electrode lead terminal forming developed product
21 . . . positive electrode base frame
22 . . . raised connecting piece
22a . . . raised connecting piece forming region (connected portion)
23 . . . reinforcing pieces
23a . . . reinforcing piece forming region (connected portion)
24 . . . terminal exposed portion
26a . . . cutout concave portion
3 . . . negative electrode lead terminal
31 . . . negative electrode base frame
32 . . . flat connecting piece
33 . . . guide piece
33a . . . guide piece forming region (connected portion)
4 . . . exterior sealing element

The invention claimed is:

1. A solid electrolytic capacitor comprising:
a capacitor element having a positive electrode lead wire protruding from a front end face of the capacitor element and a negative electrode layer provided at an outer periphery of the capacitor element;
a positive electrode lead terminal electrically connected to the positive electrode lead wire; and
a negative electrode lead terminal electrically connected to the negative electrode layer,
wherein the capacitor element, the positive electrode lead terminal, and the negative electrode lead terminal are sealed with an exterior sealing element made of synthetic resin except for a part of the positive electrode lead terminal and the negative electrode lead terminal, and
wherein the positive electrode lead terminal includes:
a positive electrode base frame arranged along a lower surface of the exterior sealing element so as to correspond to the positive electrode lead wire;
a raised connecting piece arranged to extend upward from an edge of the positive electrode base frame along a front end face of the capacitor element and having an upper edge to which the positive electrode lead wire is connected; and
reinforcing pieces arranged at both side edges of the raised connecting piece and between both side edges of the positive electrode base frame, the reinforcing pieces extending above the positive electrode base frame such that a force acting downward on the raised connecting piece is received by the positive electrode base frame via the reinforcing pieces;
the raised connecting piece and the positive electrode lead wire are joined by welding;
the positive electrode lead wire is secured to the raised connecting piece in such a manner that the positive electrode lead wire is fitted in a dent of the raised connecting piece; and
a fit-in amount of the positive electrode lead wire with respect to the raised connecting piece is $2/5$ to $3/4$ of an outer diameter of the positive electrode lead wire.

2. The solid electrolytic capacitor as recited in claim 1, wherein the raised connecting piece is formed by upwardly bending a piece connected to an edge of the positive electrode base frame.

3. The solid electrolytic capacitor as recited in claim 2, wherein cutout concave portions are formed on both sides of a bending portion of the raised connecting piece positioned between the positive electrode base frame and the raised connecting piece.

4. The solid electrolytic capacitor as recited in claim 1, wherein the reinforcing pieces are formed by bending portions connected to side edges of the raised connecting piece.

5. The solid electrolytic capacitor as recited in claim 1, wherein the negative electrode lead terminal includes a negative electrode base frame arranged along a lower surface of a rear portion of the exterior sealing element, and a flat connecting piece connected to a lower surface of the capacitor element.

6. The solid electrolytic capacitor as recited in claim 1, wherein the negative electrode lead terminal is provided with guide pieces arranged to extend upward along a rear end face of the capacitor element.

7. The solid electrolytic capacitor as recited in claim 6, wherein the guide pieces are formed by upwardly bending pieces connected to both side edges of the negative electrode base frame.

8. A manufacturing method of a solid electrolytic capacitor, the method comprising:
a step of preparing a capacitor element provided with a positive electrode lead wire protruding from a front end face of the capacitor element and a negative electrode layer formed at an outer periphery of the capacitor element;
a step of preparing a positive electrode lead terminal including a positive electrode base frame, a raised connecting piece arranged to extend upward from an edge of the positive electrode base frame, and reinforcing pieces arranged at both side edges of the raised connecting piece and between both side edges of the positive electrode base frame;
a step of preparing a negative electrode lead terminal;
a step of connecting the positive electrode lead wire to an upper end edge of the raised connecting piece in a state in which the positive electrode lead terminal is arranged such that the positive electrode base frame is arranged at a lower portion in front of the capacitor element;
a step of connecting the negative electrode lead terminal to the negative electrode layer of the capacitor element; and
a step of forming an exterior sealing element by molding the capacitor element having both the lead terminals with synthetic resin except for a portion of both the lead terminals; wherein
a tabular positive electrode lead terminal forming developed product having a positive electrode base frame forming region corresponding to the positive electrode base frame, a raised connecting piece forming region connected to an edge of the positive electrode base frame forming region, and reinforcing piece forming regions connected to both side edges of the raised connecting piece forming region is preliminarily prepared;

the step of preparing the positive electrode lead terminal includes:

a step of forming the raised connecting piece by bending the raised connecting piece forming region of the tabular positive electrode lead terminal forming developed product with respect to the positive electrode base frame forming region; and a step of forming the reinforcing pieces by bending the reinforcing piece forming regions of the positive electrode lead terminal forming developed product with respect to the raised connecting piece forming region;

at the step of preparing the positive electrode lead terminal, the step of forming the raised connecting piece is performed after performing the step of forming the reinforcing piece; and a step of connecting the positive electrode lead wire to the raised connecting piece by fitting the positive electrode lead wire in a dent of the raised connecting piece and spot welding; wherein a fit-in amount of the positive electrode lead wire with respect to the raised connecting piece is $2/5$ to $3/4$ of an outer diameter of the positive electrode lead wire.

9. The manufacturing method of a solid electrolytic capacitor as recited in claim 8, wherein, in the step of forming the reinforcing pieces, the reinforcing pieces are bent to extend above the positive electrode base frame such that a force acting downward on the raised connecting piece is received by the positive electrode base frame via the reinforcing pieces.

* * * * *